United States Patent [19]
Nishi

[11] Patent Number: 4,782,703
[45] Date of Patent: Nov. 8, 1988

[54] TEMPERATURE COMPENSATED PRESSURE SIGNAL GENERATOR

[75] Inventor: Takeshi Nishi, Yokohama, Japan

[73] Assignee: Honeywell Inc., Minneapolis, Minn.

[21] Appl. No.: 934,240

[22] Filed: Nov. 24, 1986

[30] Foreign Application Priority Data

Nov. 29, 1985 [JP] Japan ............................ 60-183826[U]

[51] Int. Cl.$^4$ ............................ G01L 7/08; G01L 9/00
[52] U.S. Cl. ........................................ 73/708; 73/717; 73/754; 73/756
[58] Field of Search ................... 73/708, 706, 716, 717, 73/718, 719, 720, 721, 722, 756, 754

[56] References Cited

U.S. PATENT DOCUMENTS

| | | | |
|---|---|---|---|
| 4,264,889 | 4/1981 | Yamamoto et al. | 73/708 |
| 4,370,890 | 2/1983 | Frick | 73/708 |
| 4,599,906 | 7/1986 | Freud et al. | 73/708 |

FOREIGN PATENT DOCUMENTS 0546801 3/1977 U.S.S.R. ................ 73/708

Primary Examiner—Donald O. Woodiel
Attorney, Agent, or Firm—Mitchell J. Halista; Albin Medved

[57] ABSTRACT

A differential pressure signal generator uses a pressure sensor arranged to sense differential pressure between a pair of right and left pressure measuring chambers in right and left portions of a signal generator body to which high and low pressure-side measured pressures are applied through respective barrier diaphragms and a center diaphragm arranged to define right and left pressure measuring chambers with the center diaphragm providing a pressure coupling to a fill fluid contacting the pressure sensor and being made of a material having a larger thermal expansion coefficient than the right and left portions of the generator body to provide an ambient temperature compensation by absorbing temperature induced volume changes in the full fluid. The temperature compensation is also applicable to an absolute pressure signal generator using a diaphragm to transmit a measured pressure to a sensor located within a body of the signal generator.

6 Claims, 2 Drawing Sheets

TEMPERATURE COMPENSATED PRESSURE SIGNAL GENERATOR

BACKGROUND OF THE INVENTION

1. Field of the Invention

The present invention relates to a pressure signal generator for detecting a pressure or the like of various types of process fluids. More specifically, the present invention is directed to a pressure signal generator wherein a variation in pressure at an overload pressure protective operation point caused by an ambient temperature change is compensated to improve measurement performance.

2. Description of the Prior Art

Conventionally, e.g., when a flow rate of a fluid in a tube is to be measured, an orifice plate is provided in the tube as a fluid resistance, and a pressure difference between the upstream and downstream side fluids with respect to the plate is calculated based on a predetermined calculation formula. In a differential pressure signal generator, for measuring the pressure difference, right and left measuring chambers are defined by a center diaphragm in a detector body. High and low pressure-side measured pressures are supplied to the right and left measuring chambers through respective barrier diaphragms. A movement of a fill liquid sealed in the measuring chambers caused by the pressure difference is converted to an electrical output by a strain in a semiconductor sensor or the like which is provided in a fill fluid circuit.

In the differential pressure signal generator having the above arrangement, when an excessive or overload pressure exceeding a predetermined pressure is applied to a high or low pressure-side barrier diaphragm, a fill liquid sealed between the corresponding diaphragm and the detector body-side pressure-receiving surface as a pressure transmitting medium flows to the center diaphragm side, and the barrier diaphragm is caused to contact a body pressure-receiving surface, so that a pressure exceeding the predetermined pressure will not be applied to a pressure sensor. The pressure at an excessive pressure protective operaiton point is set to be smaller than a maximum pressure capability of the pressure sensor in the signal generator. Concurrently, a maximum measurable pressure of the signal generator is determined to be lower than the pressure at the excessive pressure protective operation point.

In the differential pressure signal generator having the above arrangement, however, the fill liquid, such as silicone oil, sealed in the detector pressure measuring chambers of the detector body as the pressure transmitting medium is expanded or contracted by an ambient temperature change, and its volume is changed by the expansion/contraction. This changes the internal pressure of the detector pressure measuring chamber, thus causing a pressure at an excessive pressure protective operation point to fluctuate greatly. When the variation in pressure at the excessive pressure protective operation point is large, the maximum measurable pressure of the signal generator must be set to be lower than the maximum pressure capability of the sensor by the variation thereby reducing the measuring performance of the signal generator. The same problem occurs in a pressure signal generator which detects a pressure of various types of fluids by using a detector pressure measuring chamber containing a fill liquid.

SUMMARY OF THE INVENTION

An object of the present invention is to provide an improved pressure signal generator utilizing a compensation for a temperature induced fill fluid volume variation in a fill fluid sealed in the signal generator.

In accomplishing this and other objects, there has been provided, in accordance with the present invention, a pressure signal generator having a pressure sensor arranged to sense differential pressure between a pair of right and left pressure measuring chambers in right and left portions of a signal generator to which high and low pressure-side measured pressures are applied through respective barrier diaphragms, and a center diaphragm means arranged to define right and left pressure measuring chambers with of the center diaphragm means a pressure coupling to a fill fluid contacting the pressure sensor and having a larger thermal expansion coefficient than the right and left portions of the generator body.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

In a differential pressure signal generator according to the present invention, at least a peripheral portion of a center diaphragm defining right and left pressure measuring chambers in a detector body to which high and low-pressure side measured pressures are applied is formed of a material having a larger thermal expansion coefficient than the detector bodies According to the present invention, a radial tensile force that is generated in a peripheral portion of a center diaphragm which corresponds to a coupling to detector bodies is changed in accordance with a temperature change by utilizing different thermal expansion coefficients of the center diaphragm and the detector bodies, and the compliance of the center diaphragm is thus changed in accordance with a change in volume of a pressure transmitting medium due to the temperasture change, in order to minimize a variation in cessive pressure protective operation point which is caused by the temperature change, thus improving measurement performance.

Figure 1:
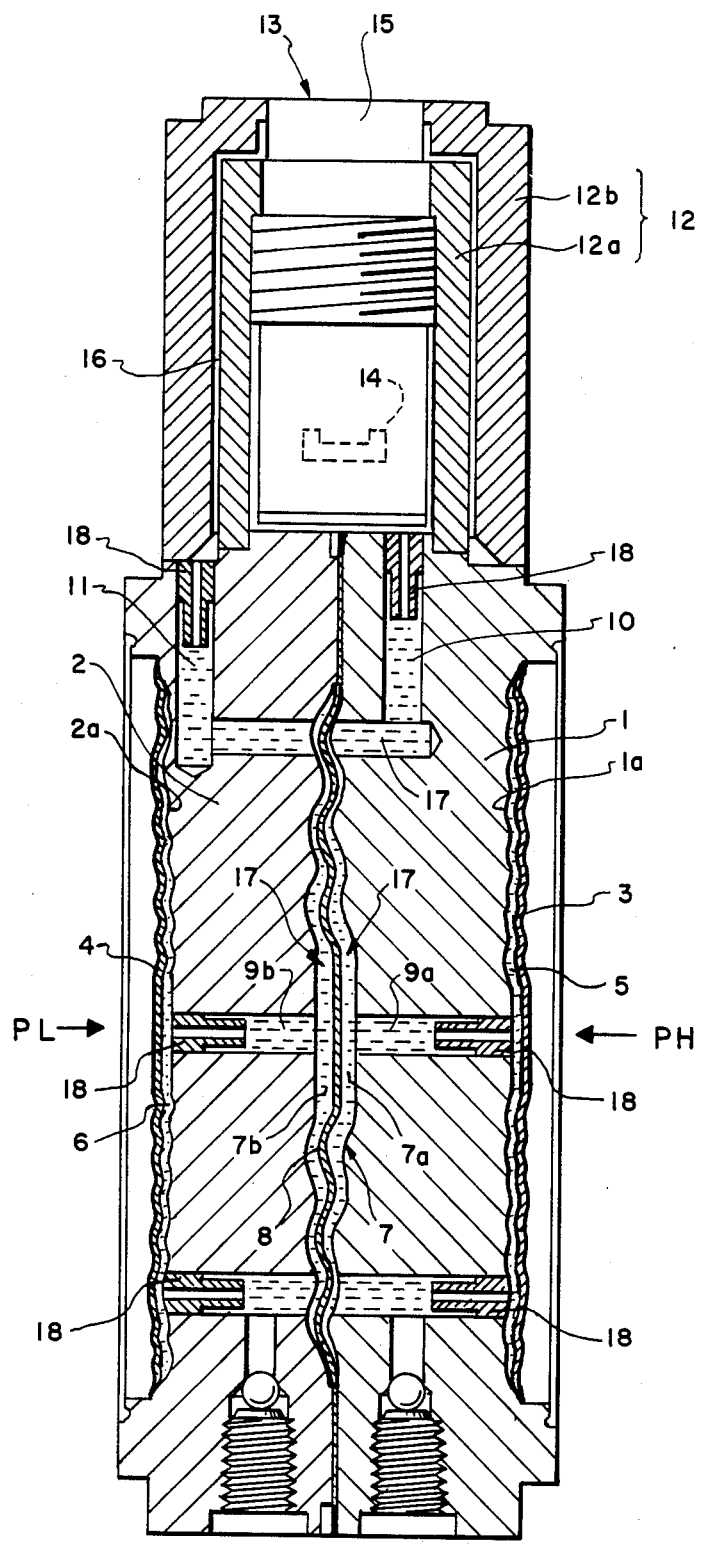
FIG. 1 is a cross-sectional illustration of a differential pressure signal generator containing an embodiment of the present invention.

Referring to FIG. 1, reference numerals 1 and 2 denote a pair of right and left portions of a detector body. High and low pressure-side barrier diaphragms 3 and 4 having corrugated substantially circular shapes are mounted on the outer surfaces of the detector portions 1 and 2, i.e., pressure-receiving surfaces 1a and 2a. Note that the pressure-receiving surfaces 1a and 2b are corrugated to provide mating surfaces for the barrier diaphragms 3 and 4, respectively, and define therebetween pressure measuring chambers 5 and 6 respectively. A high pressure PH of the upstream side of the orifice plate in a tube in which the pressure is being measured (not shown) and a low pressure PL of the downstream side thereof are applied to the outer surfaces of the barrier diaphragms 3 and 4, respectively by any suitable means, e.g., a fluid conduit system, such elements being well-known in the art.

A body inner chamber 7 is centrally formed between the detector body 1 and 2. The body inner chamber 7 is partitioned into a pair of right and left chambers 7a and 7b by a center diaphragm 8. The chamber 7a communicates with the high pressure-side pressure measuring chamber 5 through a communication path 9a and with a fill fluid circuit 10. The chamber 7b communicates with the low pressure-side pressure measuring chamber 6 through a communication path 9b and with a fill fluid circuit 11.

A header 12, comprising inner and outer cylinders 12a and 12b and made of stainless steel or the like, is provided on the upper ends of the outer surfaces of the body portions 1 and 2. A pressure sensor 13 is arranged in the header 12. The sensor 13 has a known semiconductor pressure sensor element 14 located between the fill fluid circuits 10 and 11, and a cover 15, made of carbon steel or the like, for protecting the pressure sensor element 14 and sealing the open ends of the inner and outer cylinders 12a and 12b. In this case, the high pressure-side fill fluid circuit 10 communicates with the interior of the inner cylinder 12a and supplies the high pressure PH to a first surface side of the pressure sensor element 14. The low pressure-side fill fluid circuit 11 communicates with a path (not shown) defined in the cover 15 through a gap fluid path 16 between the inner and outer cylinders 12a 12b, and supplies the low pressure PL to a second surface side of the pressure sensor element 14. A fill liquid 17, such as silicone oil, is sealed as a presure transmitting medium in the fluid communication paths extending from the pressure measuring chambers 5 asnd 6 to the high and low pressure sides of the pressure sensor 14 through the communication paths 9a and 9b and the fill fluid circuits 10 and 11, respectively. Note that reference numerals 18 denote plugs having fill fluid capillaries provided in the high and low pressure-side communication paths of the fill fluid.

In the differential pressure signal generator having the above arrangement, when the high and low pressures PH and PL from the process die are applied to the barrier diaphragms 3 and 4, respectively, a differential pressure (PH−PL) is applied to the semiconductor pressure sensor element 14. Then, the pressure sensor element 14 deforms in accordance with the differential pressure. The amount of deformation is electrically manifested, is amplified by an amplifier (not shown), and is displayed on a recorder, meter, etc. or is transmitted to a remote location.

According to the present invention, the differential pressure generator having the above arrangement is characterized in that the center diaphragm 8 (or its peripheral portion as a coupling to the detector body portions 1 and 2) which defines the right and left pressure measuring chambers 5 and 6 in the detector bodies 1 and 2. to which high and low pressure-side measured pressures are applied, is made of a material having a larger thermal expansion coefficient than that of the detector body portions 1 and 2. In the embodiment, the detector body portions 1 and 2 are made of a suitable material, e.g., carbon steel, and the center diaphragm 8 is made of a material, such as austenite stainless steel, which has a larger thermal expansion coefficient than the detector body portions 1 and 2.

With the above arrangement, a radial tensile force that is generated in a peripheral portion of the center diaphragm 8 which corresponds to a coupling to the detector bodies 1 and 2 is changed in accordance with an ambient temperature change by utilizing different thermal expansion coefficients of the center diaphragm and the detector body portions 1 and 2. A compliance $\phi$ of the center diaphragm 8 is thus changed in accordance with a changed in accordance with a change in volume of a fill liquid 17 as the pressure transmitting medium due to the temperature change, in order to minimize a variation in pressure at an excessive pressure protective operation point which is caused by the temperature change, this improving measurement performance. More specifically, with the above arrangement, when the ambient temperature is increased, the center diaphragm 8 is expanded compared to the detector body portions 1 and 2 side, hence becomes relatively soft, i.e., compliant, and can absorb the expansion amount of the fill liquid 17 which is expanded by the temperature increase. When the temperature is decreased, the center diaphragm 8 is hardened, thus following the change in the sealed volume of the contracted fill liquid 17.

Figure 2:
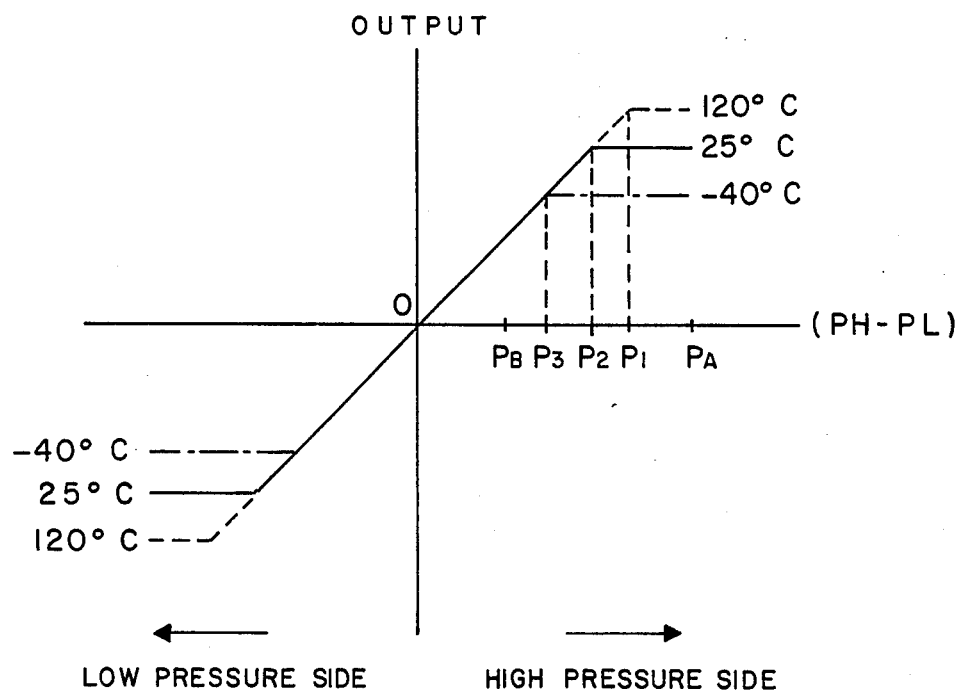
FIG. 2 is a graph for explaining the operation of the present invention.

FIG. 2 shows a graph of differential pressure input and output for explaining a relationship among a pressure at an excessive pressure protective operation point at high, medium and low temperatures, a maximum measurable pressure, and a pressure capability of the sensor 14. The reason why the above-mentioned operation and effect can be obtained will be described with reference to FIG. 2. Referring to FIG. 2, reference symbols P1, P2 and P3 denote pressures at excessive pressure protective operation points at high, medium and low temperatures (120, 25, −40° C.); and PA and PB, the pressure capability of the sensor 14 and the maximum measurable pressure of the signal generator.

As is apparent from the graph in FIG. 2, when a variation (range of P1-P3) in pressure at excessive pressure protective operation points is decreased, the maximum measurable pressure PB can be set close to the maximum pressure capability PA of the sensor 14. This is effective to improve the performance of the signal generator.

The pressure P (P1, P2, P3) at the excessive pressure protective operation points at high, medium and low temperatures can be obtained by $$P \div \Delta V/\phi \qquad (1)$$

where $\Delta V$ is the volume (the sealed amount inside the barrier diaphragms) the barrier diaphragms 5 and 6 move through before they reach the pressure-receiving surfaces of the body portions 1 and 2.

When the ambient temperature is increased in equation (1), the fill liquid volume $\Delta V$ is increased, and the pressure P (P1, P2, P3) at the excessive pressure protective operation points is increased accordingly. Therefore, in this case, when the compliance $\phi$ of the center diaphragm 8 is increased, the increase amount of the pressure P (P1, P2, P3) at the excessive pressure protective operation point is decreased.

As is well known, the compliance $\phi$ and the radial tensile force of the center diaphragm 8 are inversely proportional to each other. Therefore, if the body portions 1 nd 2 and the center diaphragm 8 are made of different materials having different thermal expansion coefficients in order to decrease the tensile force upon a temperature increase, the compliance $\phi$ of the center diaphragm 8 can be increased. In this case, when the change in volume ΔV due to the temperature change is set to equal or approximate the change in compliance φ of the center diaphragm 8, P (P1, P2, P3) is not changed, as is apparent from the equation (1), and the variation can be set to a minimum possible value. The above-described improved temperature operation and effect can thus be achieved.

Figure 3:
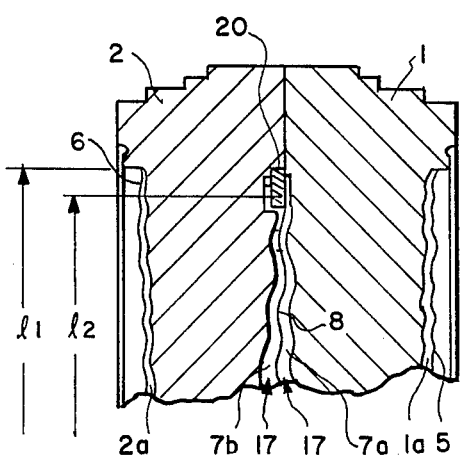
FIG. 3 is an enlarged cross-sectional view of a part of an alternate embodiment of the present invention.

The present invention is not limited to the above embodiment but the shape and the arrangement of the respective portions can be freely modified or changed as needed. For example, in the above embodiment, the entire center diaphragm 8 is amde of a material having a larger thermal expanseion coefficient than that for the detector body portions 1 and 2. However, the present invention is not limited to this. As shown in FIG. 3, a ring-like member 20, made of austenite stainless steel or the like having a larger thermal expansion coefficient than that of the detector body portions 1 and 2 made of carbon steel or the like, can be attached to the peripheral portion of the center diaphragm 8 between the detector body portions 1 and 2. In this alternate embodiment, the center diaphragm 8 can be made of stainless steel or the like which has substantially the same or smaller thermal expansion coefficient as that of the detector body portions 1 and 2. Thus, the coupling portion between the center diaphragm 8 and the body sides, and the detector body portions 1 and 2 may be made of arbitrarily selected different materials having different thermal expansion coefficients.

In the embodiment shown in FIG. 3, the following equation must be satisfied:

$$l1\ \alpha^1 < (l1-l2)\alpha^3 + l2\ \alpha^2 \qquad (2)$$

where $\alpha^1$ is the thermal expansion coefficient of the body portions 1 and 2, $\alpha^2$ is the thermal expansion coefficient of the center diaphragm 8, $\alpha^3$ is the thermal expansion coefficient of the ring-like member 20, l1 is the diameter of a portion of the ring-like member 20 welded to the body portions 1 and 2, and l2 is the diameter of a portion of the ring-like member 20 welded to the center diaphragm 8.

In the above embodiment, the present invention is applied to a differential pressure signal generator. However, it will be understood that the present invention is not limited to this but can be applied to an absolute pressure signal generator to obtain a similar operation and effect.

As described above, in the differential pressure signal generator according to the present invention, a center diaphragm for defining right and left pressure measuring chambers in detector body portions, to which high and low pressure-side measured pressures are applied, or a peripheral portion of the center diaphragm which serves as a coupling to the body sides, is made of a material having a larger thermal expansion coefficient than that of the detector bodies. Therefore, although the apparatus is simple in structure and inexpensive, a radial tensile force that is generated in a peripheral portion of a center diaphragm which corresponds to a coupling to detector body portions is changed in accordance with a temperature change by utilizing different thermal expansion coefficients of the center diaphragm and the detector body portions, and the compliance of the center diaphragm is thus changed in accordance with a change in volume of a pressure transmitting fill medium due to the temperature change, in order to minimize a variation in pressure at an excessive pressure protective operation point which is caused by the temperature change. As a result, the maximum measurable pressure of the signal generator is set close to the maximum pressure capability of the sensor, and the measurement performance can be significantly improved.

Accordingly, it may be seen that there has been provided, in accordance with the present invention an improved pressure signal generator having ambient temperature compensation.

The embodiments of the present invention in which an exclusive property or privilege is claimed are defined as follows:

1. A differential pressure signal generator comprising
   a pressure sensor,
   a pair of right and left pressure measuring chambers in right and left portions of a signal generator body to which high and low pressure-side measured pressures are applied through respective barrier diaphragms and
   a center diaphragm means arranged to define right and left pressure measuring chambers with the center diaphragm means providing a pressure coupling to a fill fluid contacting said pressure sensor and having a larger thermal expansion coefficient than the right and left portions of the generator body, wherein said right and left portions are made of carbon steel and said center diaphragm means includes a center diaphragm made of austenite stainless steel.

2. A pressure signal generator as set forth in claim 1 wherein said diaphragm means includes a ring located on a periphery of said center diaphragm between the right and left portions with the ring having a larger thermal coefficient of expansion than the right and left portions of the generator body.

3. A pressure signal generator as set forth in claim 2 wherein said ring is made of austenite stainless steel.

4. A pressure signal generator comprising
   a pressure sensor,
   a pressure measuring chamber in a portion of a signal generator body to which a measured pressure is applied through a barrier diaphragm and
   a center diaphragm means defining a pressure measuring chamber with the center diaphragm means providing a pressure coupling to a fill fluid contacting the pressure sensor and having a larger thermal expansion coefficient than the portion of the signal generator body, wherein said portion is made of carbon steel and said center diaphragm means is made of austenite stainless steel.

5. A pressure signal generator as set forth in claim 4 wherein said diaphragm means includes a diaphragm and a ring located on a periphery of said center diaphragm against the portion of the generator body with the ring having a larger thermal coefficient of expansion than the portion of the generator body.

6. A pressure signal generator as set forth in claim 5 wherein said ring is made of austenite stainless steel.

* * * * *